(12) United States Patent
Jun

(10) Patent No.: US 11,003,544 B2
(45) Date of Patent: May 11, 2021

(54) MEMORY SYSTEM AND METHOD OF OPERATING THE SAME

(71) Applicant: SK hynix Inc., Gyeonggi-do (KR)

(72) Inventor: Jang Hwan Jun, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 128 days.

(21) Appl. No.: 16/025,407

(22) Filed: Jul. 2, 2018

(65) Prior Publication Data

US 2019/0163574 A1 May 30, 2019

(30) Foreign Application Priority Data

Nov. 24, 2017 (KR) .................. 10-2017-0158620

(51) Int. Cl.
*G06F 11/00* (2006.01)
*G06F 11/14* (2006.01)
*G06F 3/06* (2006.01)

(52) U.S. Cl.
CPC ........ *G06F 11/1451* (2013.01); *G06F 3/0619* (2013.01); *G06F 3/0659* (2013.01); *G06F 3/0673* (2013.01); *G06F 11/1469* (2013.01); *G06F 2201/82* (2013.01)

(58) Field of Classification Search
CPC ............. G06F 11/3466; G06F 11/3476; G06F 11/3495; G06F 11/3636; G06F 11/0751; G06F 11/2015; G06F 11/0727; G06F 11/073; G06F 11/1008; G06F 11/2053; G06F 11/22
USPC ...................................... 714/1–57
See application file for complete search history.

(56) References Cited

U.S. PATENT DOCUMENTS

| | | | | |
|---|---|---|---|---|
| 9,898,385 | B1* | 2/2018 | O'Dowd | G06F 11/3636 |
| 2009/0063907 | A1* | 3/2009 | Tsuboi | G06F 11/3648 |
| | | | | 714/48 |
| 2011/0302453 | A1* | 12/2011 | Yu | G06F 11/0787 |
| | | | | 714/35 |
| 2013/0055013 | A1* | 2/2013 | Seki | G06F 11/1092 |
| | | | | 714/6.24 |
| 2013/0055019 | A1* | 2/2013 | Zhou | G06F 11/1417 |
| | | | | 714/21 |
| 2013/0173954 | A1* | 7/2013 | Woo | G06F 11/167 |
| | | | | 714/6.13 |
| 2013/0198566 | A1* | 8/2013 | Bastimane | G06F 11/26 |
| | | | | 714/30 |

(Continued)

FOREIGN PATENT DOCUMENTS

KR  1020090020995  2/2009

*Primary Examiner* — Sarai E Butler
(74) *Attorney, Agent, or Firm* — IP & T Group LLP

(57) ABSTRACT

Provided is a memory system and a method of operating the same. The memory system may include a memory device configured to store data; and a memory controller configured to control the memory device such that various operations including a program operation are performed in response to a request from a host, wherein the memory controller comprises: an internal memory configured to store system information; and a central processing unit (CPU) configured to control the memory device such that, when a sudden power off (SPO) occurs during the program operation of the memory device, debugging information related to system information is stored at a location in the memory device where the program operation is interrupted.

17 Claims, 8 Drawing Sheets

(56) References Cited

U.S. PATENT DOCUMENTS

| | | | |
|---|---|---|---|
| 2014/0173357 A1* | 6/2014 | Anderson | G06F 11/0778 |
| | | | 714/45 |
| 2015/0370655 A1* | 12/2015 | Tucek | G06F 3/0619 |
| | | | 714/15 |
| 2016/0070486 A1* | 3/2016 | Anderson | G06F 11/0778 |
| | | | 711/103 |
| 2016/0378344 A1* | 12/2016 | Nachimuthu | G06F 9/4403 |
| | | | 711/103 |
| 2017/0038985 A1 | 2/2017 | Chen et al. | |
| 2017/0148493 A1* | 5/2017 | Chang | G11C 7/00 |
| 2017/0168537 A1* | 6/2017 | Jantti | G06F 11/0778 |
| 2017/0288867 A1* | 10/2017 | Collier | G06F 21/602 |
| 2019/0004947 A1* | 1/2019 | Trika | G06F 9/4406 |

\* cited by examiner

MEMORY SYSTEM AND METHOD OF OPERATING THE SAME

CROSS-REFERENCE TO RELATED APPLICATION

The present application claims priority under 35 U.S.C. § 119(a) to Korean patent application number 10-2017-0158620, filed on Nov. 24, 2017, the entire disclosure of which is incorporated herein by reference.

BACKGROUND

Field of Invention

Various embodiments of the present disclosure generally relate to a memory system and a method of operating the memory system. Particularly, the embodiments relate to a memory system, which writes debugging information to an open block for a rebuild operation after a sudden power off, and a method of operating such memory system.

Description of Related Art

A memory system may include a memory device and a memory controller.

The memory device may store data or output stored data. For example, the memory device may be implemented as a volatile memory device in which data is lost when the supply of power is interrupted, or as a nonvolatile memory device in which stored data is retained even if the supply of power is interrupted.

The memory controller may control data communication between a host and the memory device.

The host is capable of communicating with the memory device through the memory controller using an interface protocol, such as Peripheral Component Interconnect-Express (PCI-E), Advanced Technology Attachment (ATA), Serial ATA (SATA), Parallel ATA (DATA) or Serial Attached SCSI (SAS). Interface protocols between the host and the memory system are not limited to the above-described examples, and may include various interfaces, such as a Universal Serial Bus (USB), a Multi-Media Card (MMC), an Enhanced Small Disk Interface (ESDI), or Integrated Drive Electronics (IDE).

SUMMARY

Various embodiments of the present disclosure are directed to a memory system, which writes debugging information to an open block, thus efficiently utilizing the storage area of the memory system.

An embodiment of the present disclosure may provide for a memory system. The memory system may include a memory device configured to store data; and a memory controller configured to control the memory device such that various operations including a program operation are performed in response to a request from a host, wherein the memory controller comprises: an internal memory configured to store system information; and a central processing unit (CPU) configured to control the memory device such that, when a sudden power off (SPO) occurs during the program operation of the memory device, debugging information related to system information is stored at a location in the memory device where the program operation is interrupted.

An embodiment of the present disclosure may provide for a memory system. The memory system may include a memory device configured to include a plurality of memory blocks in which data is stored; and a memory controller configured to control the memory device such that debugging information is stored in an open block, among the plurality of memory blocks, on which an operation is interrupted when a sudden power off (SPO) occurs.

An embodiment of the present disclosure may provide for a method of operating a memory device. The method may include performing a program operation on a selected page of the memory device; writing debugging information to the selected page during a boot process of the memory device after a sudden power off (SPO) occurs while the program operation is being performed; mapping an address of the selected page in which the debugging information is stored, using a controller; reading the debugging information from the selected page in response to the mapped address during a subsequent boot process, using the controller; and detecting an environment for a previously performed rebuild operation based on the read debugging information, and then reconstructing an environment that existed at a time at which the SPO off has occurred.

An embodiment of the present disclosure may provide for a memory system. The memory system may include a memory device including a plurality of pages; and a controller suitable for: controlling the memory device to copy data of an (i−1)th page into an (i+1)th page and to store debugging information of the memory system into an (i)th page after a sudden power off while programming the (i)th page; and using the debugging information to reconstruct an environment for a rebuild operation after a subsequent sudden power off

DETAILED DESCRIPTION

Advantages and features of the present disclosure, and methods for achieving the same in the context of various embodiments are described in detail below, together with the accompanying drawings. The present disclosure is not limited to the following embodiments but may be embodied in other forms. The embodiments described below are provided so that the present disclosure is thorough and complete and fully conveys the technical spirit of the disclosure to those skilled in the art. Moreover, reference to "an embodiment" does not necessarily mean only one embodiment, and different references to "an embodiment" are not necessarily to the same embodiment(s).

It will be understood that when an element is referred to as being "coupled" or "connected" to another element, the element may be directly coupled or connected to the other element or intervening elements may be present therebetween. In the specification, when an element is referred to as "comprising" or "including" a component, such term does not preclude the inclusion of one or more other components, unless the context clearly indicates otherwise.

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

The drawings are not necessarily to scale and, in some instances, proportions may have been exaggerated in order to clearly illustrate features of the embodiments.

The terminology used herein is for the purpose of describing particular embodiments only and is not intended to be limiting of the present invention.

As used herein, singular forms may include the plural forms as well, unless the context clearly indicates otherwise.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Hereinafter, the various embodiments of the present invention will be described in detail with reference to the attached drawings.

Figure 1:
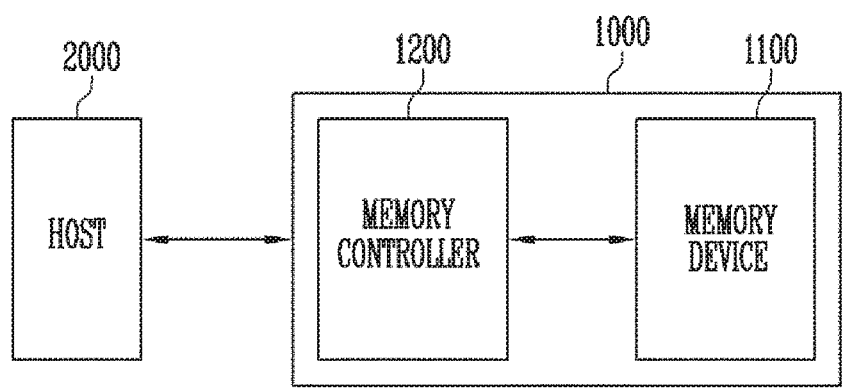
FIG. 1 is a diagram illustrating a memory system according to an embodiment of the present disclosure.

FIG. 1 is a diagram illustrating a memory system according to an embodiment of the present disclosure.

Referring to FIG. 1, a memory system 1000 may include a memory device 1100 which stores data, and a memory controller 1200 which controls the memory device 1100 under the control of a host 2000.

The host 2000 is capable of communicating with the memory system 1000 using an interface protocol, such as Peripheral Component Interconnect-Express (PCI-E), Advanced Technology Attachment (ATA), Serial ATA (SATA), Parallel ATA (PATA), or Serial Attached SCSI (SAS). Interface protocols between the host 2000 and the memory system 1000 are not limited to the above-described examples, and may further include interface protocols, such as a Universal Serial Bus (USB), a Multi-Media Card (MMC), an Enhanced Small Disk Interface (ESDI), or Integrated Drive Electronics (IDE).

The memory controller 1200 may control the overall operation of the memory system 1000, and may control data exchange between the host 2000 and the memory device 1100. For example, the memory controller 1200 may convert received information and store and output the converted information so that commands, addresses, and data may be transmitted/received between the host 2000 and the memory device 1100. For example, the memory controller 1200 may control the memory device 1100 such that a program, a read, or an erase operation is performed. In an embodiment, the memory device 1100 may include a double data rate synchronous dynamic random access memory (DDR SDRAM), a low power double data rate4 (LPDDR4) SDRAM, a graphics double data rate (GDDR) SDRAM, a low power-DDR (LPDDR) SDRAM, a Rambus DRAM (RDRAM), or a flash memory.

Further, when a sudden power off (SPO) occurs while a program operation is being performed, the memory controller 1200 may control the memory device 1100 so that debugging information is stored in an open block in which the program operation is interrupted.

When a SPO subsequently occurs, the memory controller 1200 may reconstruct an environment for a rebuild operation, which was previously performed, using the debugging information stored in the memory device 1100 during a rebuild operation.

Figure 2:
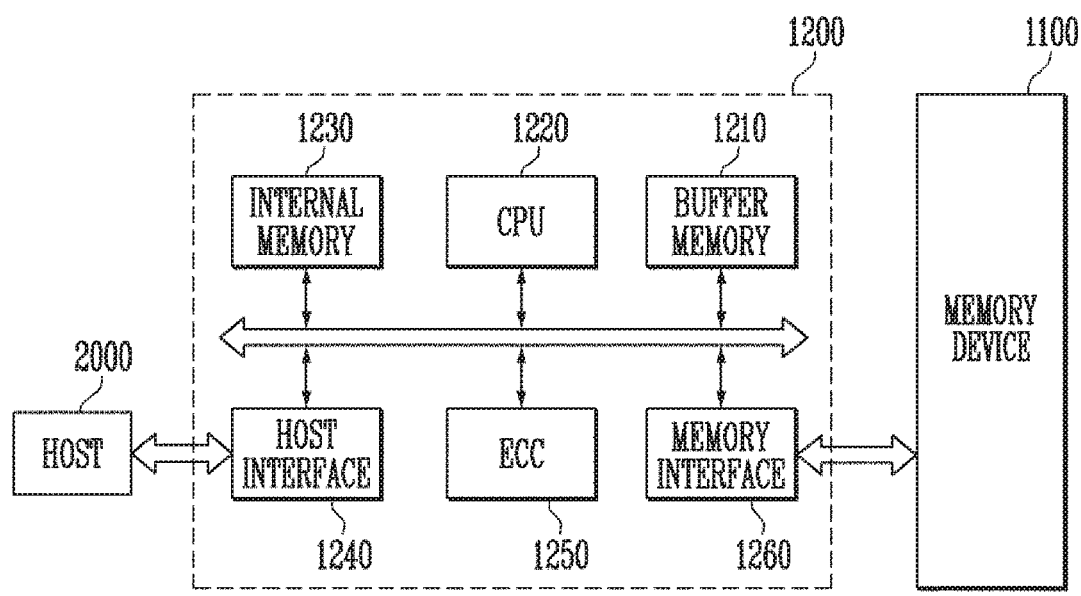
FIG. 2 is a diagram illustrating in detail a memory controller of FIG. 1.

FIG. 2 is a diagram illustrating in detail the memory controller of FIG. 1.

Referring to FIG. 2, the memory controller 1200 may include a buffer memory 1210, a Central Processing Unit (CPU) 1220, an internal memory 1230, a host interface 1240, an Error Correction Code (ECC) unit 1250, and a memory interface 1260 to control communication between the host 2000 and the memory device 1100.

The buffer memory 1210 may temporarily store data that is transmitted and received between the memory controller 1200 and the memory device 1100. For example, during a program operation, data to be programmed may be temporarily stored in the buffer memory 1210 before being transmitted to the memory device 1100, and the stored data may be reused when the memory device 1100 fails in the program operation. Further, during a read operation, data read from the memory device 1100 may be temporarily stored in the buffer memory 1210. For example, when a preset amount of data is temporarily stored in the buffer memory 1210 during a read operation, the read data may be outputted to the host 2000 through the host interface 1240.

The CPU 1220 may perform various types of operations for controlling the memory device 1100, may generate commands and addresses, or may run firmware.

When a SPO occurs while a program operation is being performed on the memory device 1100, the CPU 1220 may control the memory device 1100 so that debugging information is stored in the open block of the memory device 1100 in which the program operation is interrupted during a boot process after the SPO. For example, the CPU 1220 may perform a rebuild operation during a boot process after the SPO, and may control the memory device 1100 so that the debugging information is stored in the open block, in which the program operation is interrupted due to the SPO, in the rebuild operation.

When a SPO subsequently occurs again, the debugging information stored in the memory device 1100 may be used to detect which type of operation was performed in the previous rebuild operation of the memory system (e.g., 1000 of FIG. 1), during a boot process after the subsequent SPO. For this operation, during the rebuild operation performed in the boot process after the subsequent SPO, debugging information may be read from the open block of the memory device 1100, and the CPU 1220 may rewrite the read debugging information to the internal memory 1230, and may reconstruct a previous rebuild operation environment based on the read debugging information.

The internal memory 1230 may be used as a storage device capable of storing various types of system information required for the operation of the memory controller 1200. For example, the internal memory 1230 may be implemented as a Static RAM (SRAM). The internal memory 1230 may include a table in which various types of system information required for the operation of the memory system 1000 are stored.

Also, the internal memory 1230 may store address mapping information of a page on which the program operation is interrupted due to a SPO. Such information may be read when the memory system (e.g., 1000 of FIG. 1) boots. The CPU 1220 may determine whether debugging information is stored in the memory device 1100, may read debugging information from the memory device 1100 and write the debugging information to the internal memory 1230 if it is determined that the debugging information is stored in the memory device 1100, and may perform a subsequent operation based on the information written to the internal memory 1230.

The host interface 1240 may be configured to communicate with the external host 2000 coupled to the memory system 1000 under the control of the CPU 1220. For example, the host interface 1240 may receive a write command, data, and a logical address corresponding to the write command from the host 2000. Further, the host interface 1240 may receive a read command and a logical address corresponding to the read command from the host 2000.

The ECC unit 1250 may detect or correct an error contained in data read from the memory device 1100. For example, the ECC unit 1250 may perform an ECC encoding operation based on data to be written to the memory device 1100 through the memory interface 1260. The ECC-encoded data may be transferred to the memory device 1100 through the memory interface 1260.

Further, the ECC unit 1250 may perform ECC decoding on data received from the memory device 1100 through the memory interface 1260. The ECC unit 1250 may perform an error correction operation based on a Bose-Chaudhuri-Hocquenghem (BCH) code or a Low-Density Parity-Check (LDPC) code.

Further, the ECC unit 1250 may perform ECC encoding or ECC decoding based on data to be written to the buffer memory 1210.

The memory interface 1260 may communicate with the semiconductor memory device 1100 under the control of the CPU 1220. The memory interface 1260 may transmit/receive commands, addresses, and data to/from the memory device 1100 through a channel. For example, the CPU 1220 may control the operations of the memory controller 1200 using codes.

Figure 3:
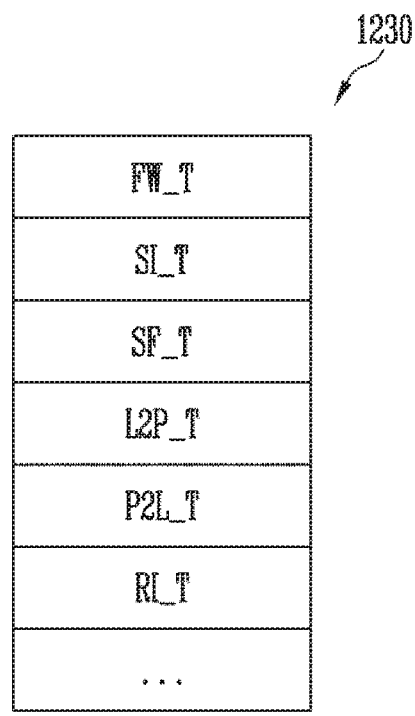
FIG. 3 is a diagram illustrating in detail an internal memory of FIG. 2.

FIG. 3 is a diagram illustrating in detail the internal memory of FIG. 2.

Referring to FIG. 3, the internal memory 1230 may be implemented as an SRAM, and may store tables in which various types of information required for the operation of a memory system (e.g., 1000 of FIG. 1) are stored. For example, the internal memory 1230 may store a firmware information table (FW_T), a system information table (SI_T), a system fragment table (SF_T), a logical to physical address table (L2P_T), a physical to logical address table (P2L_T), a rebuild information table (RI_T), and the like.

When the memory system 1000 boots, the memory controller 1200 may primarily read system information stored in the internal memory 1230, and may set various conditions required for the operation of the memory system 1000 based on the read information.

Figure 4:
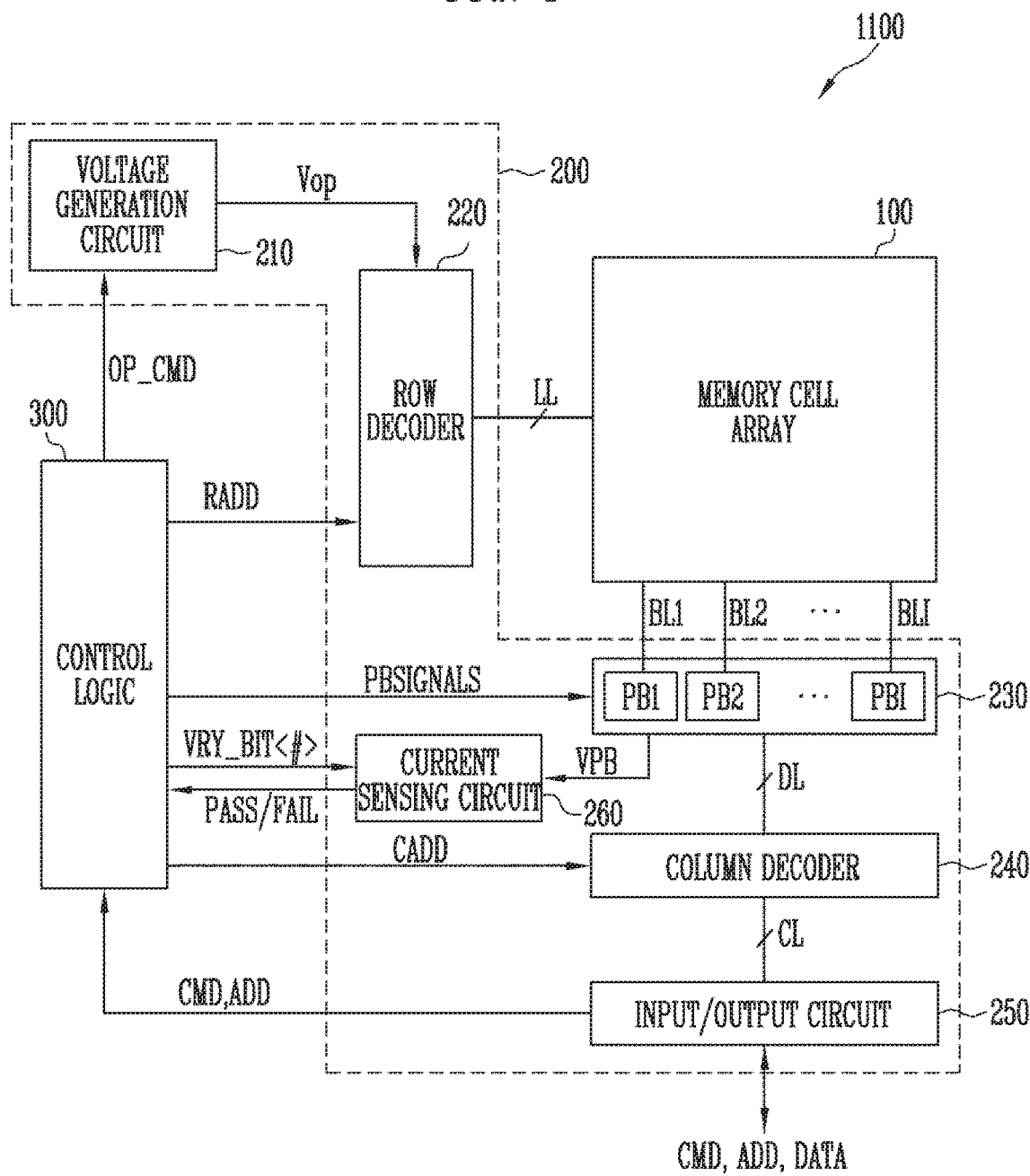
FIG. 4 is a diagram illustrating in detail a memory device of FIG. 1.

FIG. 4 is a diagram illustrating in detail the memory device of FIG.

Referring to FIG. 4, the memory device 1100 may include a memory cell array 100 in which data is stored. The memory device 1100 may include peripheral circuits 200 configured to perform a program operation for storing data in the memory cell array 100, a read operation for outputting the stored data, and an erase operation for erasing the stored data. The memory device 1100 may include a control logic 300 which controls the peripheral circuits 200 under the control of the memory controller (e.g., 1200 of FIG. 1).

The memory cell array 100 may include a plurality of memory cells. In the memory blocks, user data and various types of information required for the operation of the memory device 1100 may be stored.

Further, in the memory cell array 100, debugging information at a time at which a SPO occurs may be stored. For example, when a SPO occurs during a program operation, the debugging information may be stored in an open block in which the program operation is interrupted.

Each of the memory blocks may be implemented as a two-dimensional (2D) structure or a three-dimensional (3D) structure. Each memory block may be mainly implemented as a 3D structure to improve the degree of integration. For example, each of the memory blocks having a 2D structure may include memory cells horizontally arranged on a substrate, and each of the memory blocks having a 3D structure may include memory cells vertically stacked on the substrate.

The peripheral circuits 200 may perform program, read, and erase operations under the control of the control logic 300. For example, the peripheral circuits 200 may include a voltage generation circuit 210, a row decoder 220, a page buffer group 230, a column decoder 240, an input/output circuit 250, and a current sensing circuit 260.

The voltage generation circuit 210 may generate various operating voltages Vop used for program, read, and erase operations in response to an operation signal OP_CMD. For example, the voltage generation circuit 210 may generate a program voltage, a verify voltage, a pass voltage, a compensation program voltage, a read voltage, an erase voltage, a turn-on voltage, etc. under the control of the control logic 300.

The row decoder 220 may transfer operating voltages Vop to local lines LL coupled to a memory block selected from among the memory blocks of the memory cell array 100 in response to a row address RADD. The local lines LL may include local word lines, local drain select lines, and local source select lines. In addition, the local lines LL may include various lines, such as source lines, coupled to the memory blocks.

The page buffer group 230 may be coupled to bit lines BL1 to BLI coupled to the memory blocks of the memory cell array 100. The page buffer group 230 may include a plurality of page buffers PB1 to PBI coupled to the bit lines BL1 to BLI. The page buffers PB1 to PBI may be operated in response to page buffer control signals PBSIGNALS. For example, the page buffers PB1 to PBI may temporarily store data received through the bit lines BL1 to BLI or may sense voltages or currents of the bit lines BL1 to BLI during a read or verify operation.

The column decoder 240 may transfer data between the input/output circuit 250 and the page buffer group 230 in response to a column address CADD. For example, the column decoder 240 may exchange data with the page buffers PB1 to PBI through data lines DL or may exchange data with the input/output circuit 250 through column lines CL.

The input/output circuit 250 may transmit a command CMD and an address ADD, received from a memory controller (e.g., 1200 of FIG. 2), to the control logic 300, or may exchange data DATA with the column decoder 240. For example, when a debugging command, an address, and debugging information are received from the memory controller 1200, the input/output circuit 250 may transmit the debugging command and the address to the control logic 300, and may transmit the debugging information to the column decoder 240.

During the read or verify operation, the current sensing circuit 260 may generate a reference current in response to an enable bit VRY_BIT<#>, and may compare a sensing voltage VPB, received from the page buffer group 230, with a reference voltage, generated by the reference current, and then output a pass signal PASS or a fail signal FAIL.

The control logic 300 may output the operation signal OP_CMD, the row address RADD, the page buffer control signals PBSIGNALS, and the enable bit VRY_BIT<#> in response to the command CMD and the address ADD, and may then control the peripheral circuits 200. The control logic 300 may determine whether a verify operation has passed or failed in response to the pass or fail signal PASS or FAIL.

In particular, when the debugging command and the address are received from the memory controller (e.g., 1200 of FIG. 2), the control logic 300 may control the peripheral circuits 200 so that the debugging information is stored in the page of a memory block corresponding to the received address.

Figure 5:
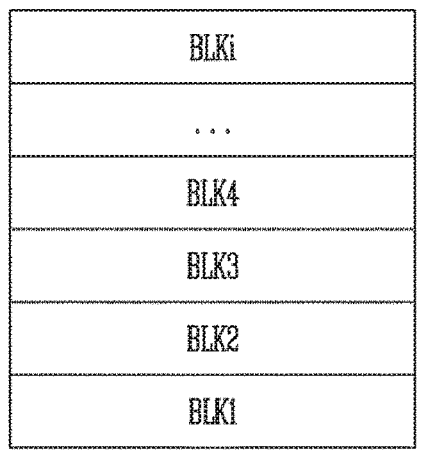
FIG. 5 is a diagram illustrating in detail a memory cell array of FIG. 4.

FIG. 5 is a diagram illustrating in detail the memory cell array of FIG. 4.

Referring to FIG. 5, the memory cell array 100 may include a plurality of planes, each of the planes including a plurality of memory blocks BLK1 to BLKi. In FIG. 5, first to i-th memory blocks BLK1 to BLKi included in any one of the plurality of planes are illustrated, as an example.

Each of the first to i-th memory blocks BLK1 to BLKi may include a plurality of memory cells in which data is stored. When the memory device 1100 is implemented as a NAND flash memory, the memory cells may be formed in a 2D structure in which they are horizontally arranged on a substrate or in a 3D structure in which they are vertically stacked on the substrate. Further, a program operation and a read operation may be performed on the memory cells on a page basis.

Among the first to i-th memory blocks BLK1 to BLKi, blocks on which the program operation has been completed may be closed blocks, blocks on which the program operation has not yet been completed may be open blocks, and blocks on which the program operation is not performed may be erase blocks.

Figure 6:
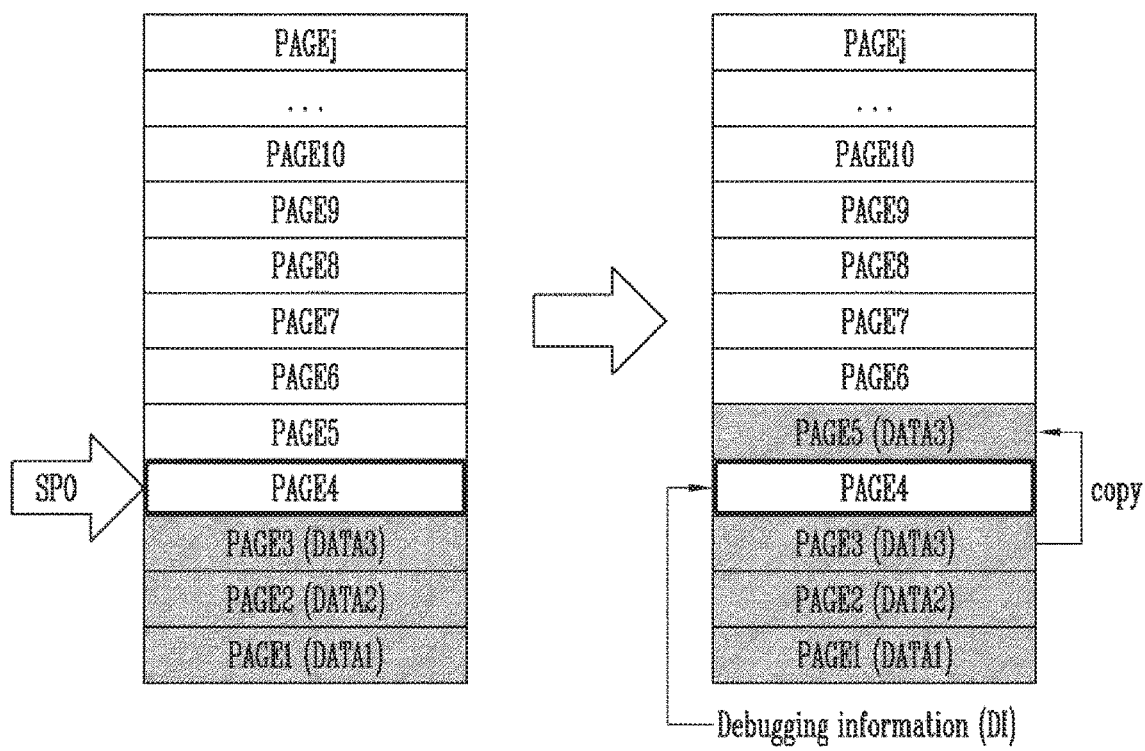
FIG. 6 is a diagram for explaining a debugging information write operation according to an embodiment of the present disclosure.

FIG. 6 is a diagram for explaining a debugging information write operation according to an embodiment of the present disclosure.

In FIG. 6, an i-th memory block BLKi among the first to i-th memory blocks BLK1 to BLKi will be described as an example.

The i-th memory block BLKi may include a plurality of pages PAGE1 to PAGEj. For example, the i-th memory block BLKi may include first to j-th pages PAGE1 to PAGEj.

A program operation may be performed on a page-by-page basis in a predetermined order. For example, the first page PAGE1 may be first programmed, and the second page PAGE2 may be programmed after the program operation performed on the first page PAGE1 has been completed. Following this order, the first to j-th pages PAGE1 to PAGEj may be sequentially programmed.

When all of the first to j-th pages PAGE1 to PAGEj are completely programmed, the memory device 1100 may terminate the program operation on the i-th memory block BLKi, and the BLKi may become a closed block. However, when a sudden power off (SPO) occurs before the program operation of the first to j-th pages PAGE1 to PAGEj is terminated, the i-th memory block BLKi may be an open block on which the program operation is not completed.

A case where a SPO occurs during the program operation of the fourth page PAGE4 will be described below by way of example.

When a SPO occurs during the program operation of the fourth page PAGE4 after the program operation of the first to third pages PAGE1 to PAGE3 has been completed, the fourth page PAGE4 is in a state in which a program operation is not yet completed. Further, due to the SPO occurring during the program operation of the fourth page PAGE4, the reliability of the third page PAGE3, which is adjacent to the fourth page PAGE4 and on which the program operation has been completed, may be deteriorated.

In particular, in a multi-level cell (MLC) in which a plurality of bits are stored in a single memory cell, program data corresponding to a plurality of logical pages should be stored in respective physical pages, and thus a SPO may occur during the program operation of the fourth page PAGE4 while the program operation of the third page PAGE3 is not yet completed.

Therefore, after a boot subsequent to the SPO, data in the third page PAGE3 may be copied to another page, for example, the fifth page PAGE5, and the program operation may be subsequently performed on the fifth page PAGE5. For this operation, the memory controller (e.g., 1200 of FIG. 2) may control the memory device 1100 so that the data stored in the third page PAGE3 is stored in the fifth page PAGE5.

The process may also avoid storing meaningless information in the fourth page PAGE4, on which the program operation is interrupted due to the SPO. Instead, the memory controller 1200 may control the memory device 1100 so that meaningful information used in the memory system 1000 is stored in the fourth page PAGE4. That is, when a SPO occurs before the program operation of the fourth page PAGE4 is completed, the memory controller 1200 may still recognize the fourth page PAGE4 as an open page. Therefore, for a next program operation subsequent to the SPO, the memory controller 1200 may program available data, instead of meaningless data, to the fourth page PAGE4, thus reducing the waste of storage capacity. For example, in the fourth page PAGE4 on which the program operation is interrupted, debugging information instead of dummy data may be stored. The debugging information stored in the fourth page PAGE4 may be used for a rebuild operation of the memory system.

Assuming that first data to third data DATA1 to DATA3 are stored in the first to third pages PAGE1 to PAGE3, the memory controller 1200 may control the memory device 1100 so that the third data DATA3 is copied to the fifth page PAGE5, which is the next page after the fourth page PAGE4, which was being programmed when the SPO occurred. Accordingly, the memory controller 1200 may map the address of a storage location, in which the third data DATA3 is stored, to the fifth page PAGE5, not to the third page PAGE3. Therefore, the third page PAGE3 is not used until a next erase operation and program operation are performed.

The debugging information DI stored in the fourth page PAGE4 may include information about an environment for a rebuild operation, which was performed when a fault occurred in the memory system 1000. For example, the debugging information DI may include information such as the operating conditions or system set values of the memory system 1000. In this way, available information that may be used by the memory system 1000 is written to the page which is program-interrupted due to a SPO, and thus the memory blocks of the memory device 1100 may be more efficiently used.

The order of the operation of writing the debugging information DI and the operation of copying data in the page on which the program operation has been completed to another page may be reversed. Further, the operation of reading and writing the debugging information DI may be performed by firmware that is running during a boot process.

Figure 7:
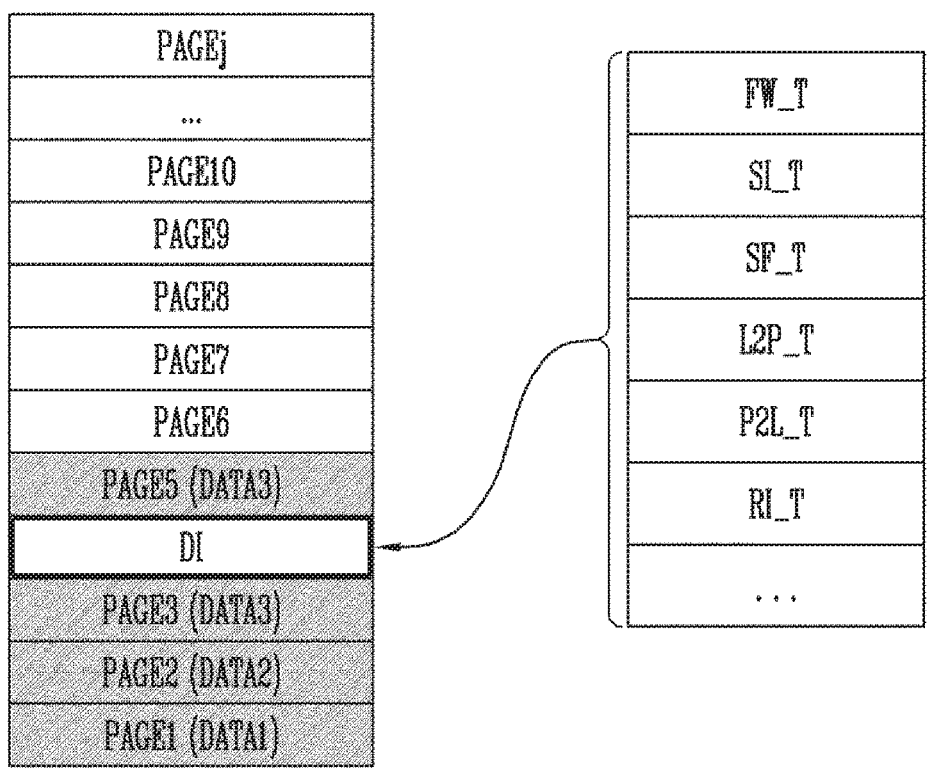
FIG. 7 is a diagram for explaining an example of information written to a memory device in a debugging information write operation.

FIG. 7 is a diagram for explaining an example of information written to a memory device in a debugging information write operation.

Referring to FIG. 7, an example of debugging information DI, described above with reference to FIG. 6, is illustrated. For example, the internal memory (e.g., 1230 of FIG. 2) of the memory controller (e.g., 1200 of FIG. 2) may store information used in the memory system (e.g., 1000 of FIG. 1). The memory system 1000 may determine the state of the memory system 1000 and make various types of settings based on the information stored in the internal memory 1230 during a boot process. For example, the memory system 1000 may determine the state of the memory device 1100 and make various types of settings required to perform a subsequent operation, based on the information stored in the internal memory 1230.

The debugging information DI, stored in a page on which a program operation is interrupted due to the sudden power off (SPO), may be information about the state of the memory system 1000 during the program operation of the corresponding page. Such information may be stored in the internal memory 1230. For example, the internal memory 1230 may store a firmware information table (FW_T), a system information table (SI_T), a system fragment table (SF_T), a logical to physical address table (L2P_T), a physical to logical address table (P2L_T), a rebuild information table (RI_T), and the like. The memory controller 1200 may reconstruct a firmware environment that existed at a time at which the SPO has occurred, based on the debugging information during a boot process.

Figure 8:
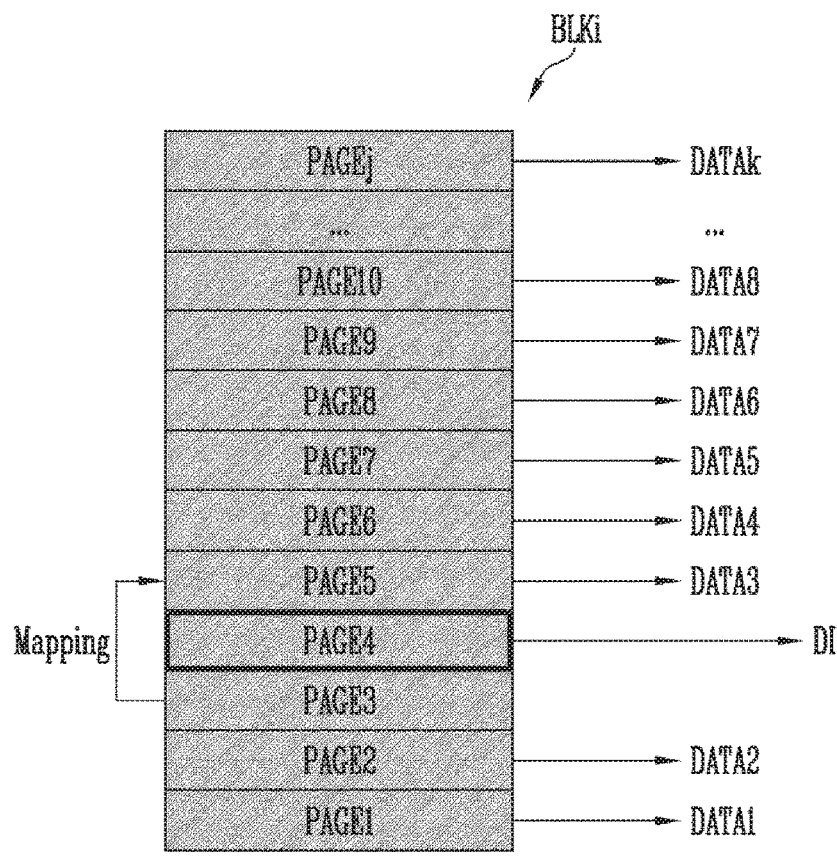
FIGS. 8 and 9 are diagrams for explaining a rebuild operation according to an embodiment of the present disclosure.
Figure 9:
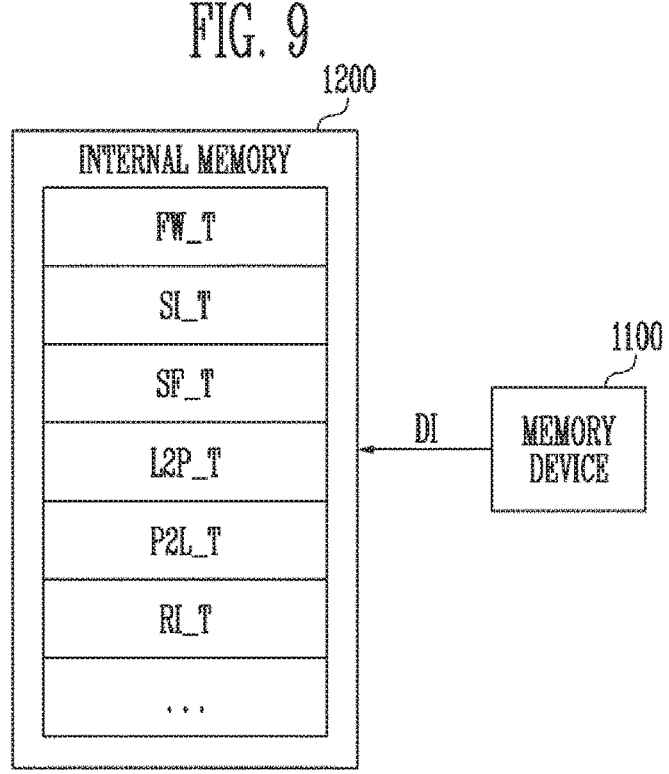

FIGS. 8 and 9 are diagrams for explaining a rebuild operation according to an embodiment of the present disclosure.

Referring to FIGS. 8 and 9, assuming that a SPO occurs while a program operation is being performed on a fourth page PAGE4 in an i-th memory block BLKi, debugging information DI may be stored in the fourth page PAGE4 in a next boot operation. The debugging information DI stored in the fourth page PAGE4 may be used for a rebuild operation for a memory system (e.g., 1000 of FIG. 1). For example, during the rebuild operation, a memory controller (e.g., 1200 of FIG. 2) may read the debugging information DI from the fourth page PAGE4 of the i-th memory block BLKi (see FIG. 8), and may rewrite system information to the internal memory 1230 based on the debugging information (see FIG. 9).

Then, the memory controller 1200 may reconstruct the operating environment of the memory system 1000 based on rebuilt information, and may control the memory device (e.g., 1100 of FIG. 1) so that a program operation is subsequently performed on fifth to j-th pages PAGE5 to PAGEj, each in an erase state, in the i-th memory block BLKi. Data stored in a program-completed page which is adjacent to the page which is program-interrupted due to a SPO may be copied to the next sequential page, which is the fifth page PAGE5 in this embodiment. For example, considering the deterioration or lack of reliability of data of the third page PAGE3, the memory controller 1200 may control the memory device 1100 so that the third data DATA3, stored in the third page PAGE3, is stored in the fifth page PAGE5. In the remaining sixth to j-th pages PAGE6 to PAGEj, the fourth data to k-th data DATA4 to DATAk may be stored.

The third page PAGE3 may be mapped to a bad page, and the page in which the third data DATA3 is stored may be newly mapped to the fifth page PAGE5.

Figure 10:
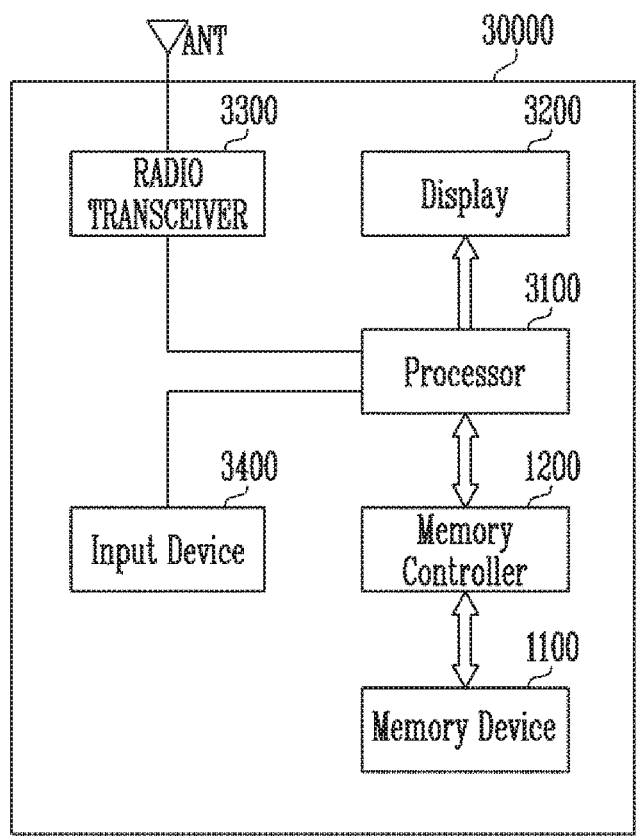
FIG. 10 is a diagram illustrating an embodiment of a memory system including the memory controller and the memory device of FIG. 2.

FIG. 10 is a diagram illustrating an application example of a memory system including the memory controller and the memory device of FIG. 2.

Referring to FIG. 10, a memory system 30000 may be implemented as a cellular phone, a smart phone, a tablet PC, a personal digital assistant (PDA) or a wireless communication device. The memory system 30000 may include a memory device 1100 and a memory controller 1200 that is capable of controlling the operation of the memory device 1100. The memory controller 1200 may control a data access operation for the memory device 1100, for example, a program operation, an erase operation or a read operation under the control of a processor 3100.

Data programmed to the memory device 1100 may be outputted via a display 3200 under the control of the memory controller 1200.

A radio transceiver 3300 may exchange radio signals through an antenna ANT. For example, the radio transceiver 3300 may change a radio signal received through the antenna ANT into a signal which may be processed in the processor 3100. Therefore, the processor 3100 may process a signal outputted from the radio transceiver 3300 and transmit the processed signal to the memory controller 1200 or the display 3200. The memory controller 1200 may transmit the signal processed by the processor 3100 to the memory device 1100. Furthermore, the radio transceiver 3300 may change a signal outputted from the processor 3100 into a radio signal, and output the changed radio signal to an external device through the antenna ANT. An input device 3400 may be used to input a control signal for controlling the operation of the processor 3100 or data to be processed by the processor 3100. The input device 3400 may be implemented as a pointing device such as a touch pad or a computer mouse, a keypad or a keyboard. The processor 3100 may control the operation of the display 3200 such that data outputted from the memory controller 1200, data outputted from the radio transceiver 3300, or data outputted from the input device 3400 is outputted via the display 3200.

In an embodiment, the memory controller 1200 capable of controlling the operation of the memory device 1100 may be implemented as a part of the processor 3100 or a chip provided separately from the processor 3100.

Figure 11:
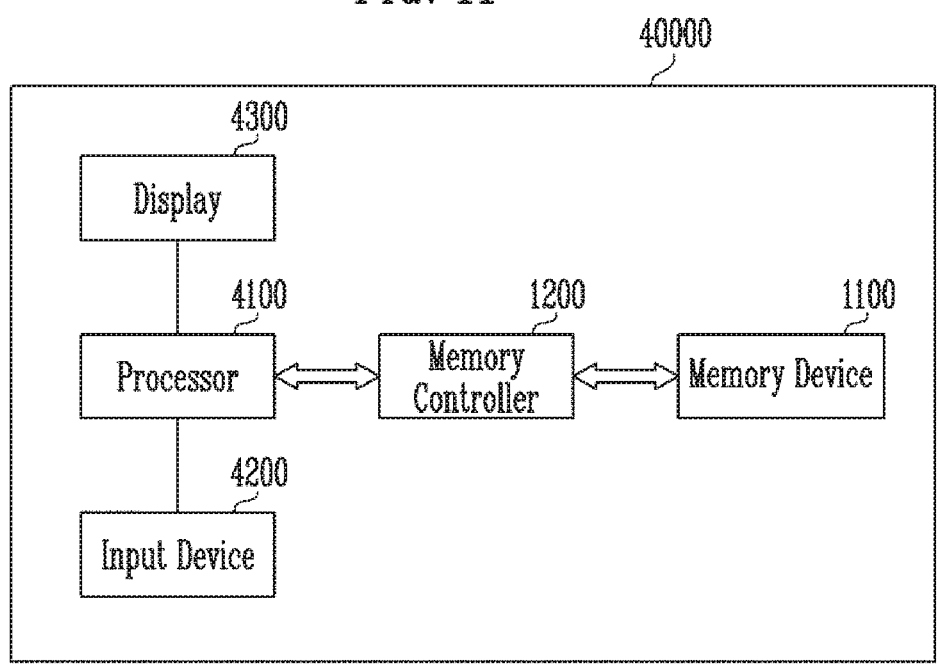
FIG. 11 is a diagram illustrating an embodiment of a memory system including the memory controller and the memory device of FIG. 2.

FIG. 11 is a diagram illustrating an application example a memory system including the memory controller and the memory device of FIG. 2.

Referring to FIG. 11, a memory system 40000 may be embodied in a personal computer, a tablet PC, a net-book, an e-reader, a personal digital assistant (PDA), a portable multimedia player (PMP), an MP3 player, or an MP4 player.

The memory system 40000 may include a memory device 1100 and a memory controller 1200 that is capable of controlling a data processing operation of the memory device 1100.

A processor 4100 may output data stored in the memory device 1100 via a display 4300 according to data inputted from an input device 4200. For example, the input device 4200 may be implemented as a pointing device such as a touch pad or a computer mouse, a keypad or a keyboard.

The processor 4100 may control the overall operation of the memory system 40000 and control the operation of the memory controller 1200. In an embodiment, the memory controller 1200 capable of controlling the operation of the memory device 1100 may be implemented as a part of the processor 4100 or a chip provided separately from the processor 4100.

Figure 12:
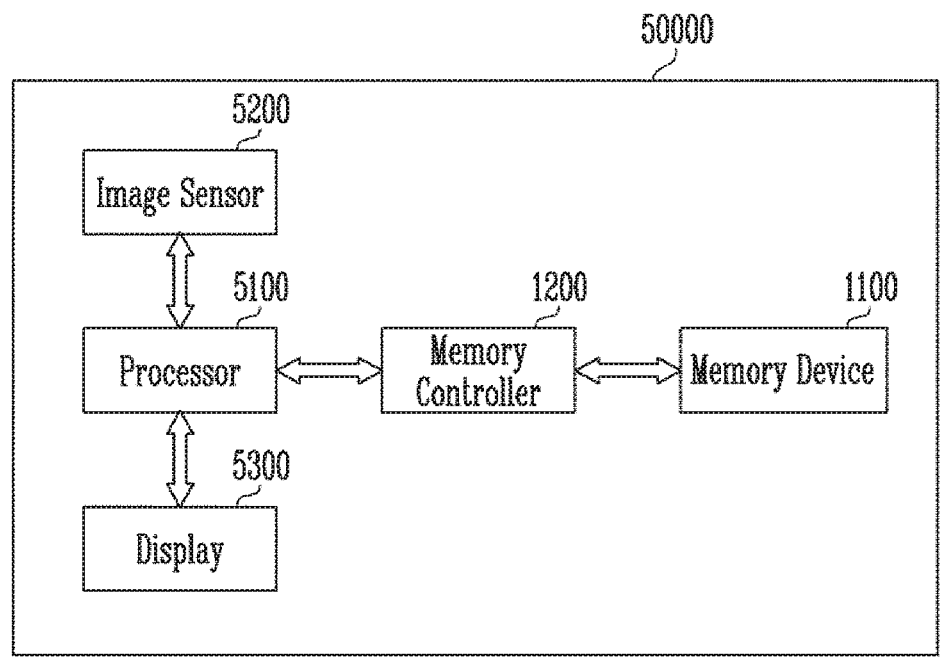
FIG. 12 is a diagram illustrating an embodiment of a memory system including the memory controller and the memory device of FIG. 2.

FIG. 12 is a diagram illustrating an application example of a memory system including the memory controller and the memory device of FIG. 2.

Referring to FIG. 12, a memory system 50000 may be embodied in an image processing device, e.g., a digital camera, a mobile phone provided with a digital camera, a smartphone provided with a digital camera, or a tablet PC provided with a digital camera.

The memory system 50000 may include a memory device 1100 and a memory controller 1200 that is capable of controlling a data processing operation of the memory device 1100, e.g., a program operation, an erase operation or a read operation.

An image sensor 5200 of the memory system 50000 may convert an optical image into digital signals. The converted digital signals may be transmitted to a processor 5100 or the memory controller 1200. Under the control of the processor 5100, the converted digital signals may be outputted via a display 5300 or stored in the memory device 1100 through the memory controller 1200. Data stored in the memory device 1100 may be outputted via the display 5300 under the control of the processor 5100 or the memory controller 1200.

In an embodiment, the memory controller 1200 capable of controlling the operation of the memory device 1100 may be implemented as a part of the processor 5100, or a chip provided separately from the processor 5100.

Figure 13:
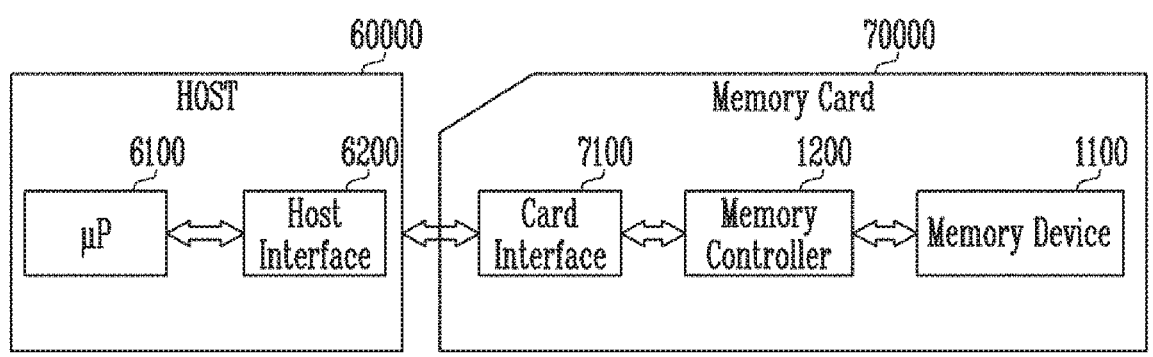
FIG. 13 is a diagram illustrating an embodiment of a memory system including the memory controller and the memory device of FIG. 2.

FIG. 13 is a diagram illustrating an application example of a memory system including the memory controller and the memory device of FIG. 2.

Referring to FIG. 13, a memory system 70000 may be embodied in a memory card or a smart card. The memory system 70000 may include a memory device 1100, a memory controller 1200, and a card interface 7100.

The memory controller 1200 may control data exchange between the memory device 1100 and the card interface 7100. In an embodiment, the card interface 7100 may be, but is not limited to, a secure digital (SD) card interface or a multi-media card (MMC) interface.

The card interface 7100 may interface data exchange between a host 60000 and the memory controller 1200 according to a protocol of the host 60000. In an embodiment, the card interface 7100 may support a universal serial bus (USB) protocol and an inter-chip (IC)-USB protocol. Here, the card interface may refer to hardware capable of supporting a protocol which is used by the host 60000, software installed in the hardware, or a signal transmission method.

When the memory system 70000 is coupled to a host interface 6200 of the host 60000, such as a PC, a tablet PC, a digital camera, a digital audio player, a mobile phone, console video game hardware or a digital set-top box, the host interface 6200 may perform data communication with the memory device 1100 through the card interface 7100 and the memory controller 1200 under the control of a microprocessor (µP) 6100.

Embodiments of the present disclosure may efficiently utilize the memory blocks of a memory device.

Further, embodiments of the present disclosure may reconstruct the environment of a memory system, implemented in a previous rebuild operation, based on debugging information, in a subsequent rebuild operation by writing the debugging information instead of dummy data to a memory device.

Various embodiments have been disclosed herein, and although specific terms are employed, they are used and are to be interpreted in a generic and descriptive sense and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A memory system, comprising:
   a memory device configured to store data, the memory device having a plurality of memory blocks, each of the plurality of memory blocks having a plurality of pages; and
   a memory controller configured to control the memory device such that various operations including a program operation on a selected page of a selected memory block are performed in response to a request from a host,
   wherein the memory controller comprises:
   an internal memory configured to store system information; and
   a central processing unit (CPU) configured to control the memory device such that, when a sudden power off (SPO) occurs during the program operation of the memory device, debugging information related to system information is stored at a location in the memory device where the program operation is interrupted,
   wherein, when the SPO occurs, the CPU controls the memory device such that the debugging information is stored in the selected memory block having the selected page on which the program operation has been interrupted, among the plurality of memory blocks.

2. The memory system according to claim 1, wherein, when the memory system boots after the SPO occurred, the CPU reads the debugging information stored in the memory device by running firmware.

3. The memory system according to claim 2, wherein the CPU reconstructs an environment for a rebuild operation, performed before the occurrence of the SPO, based on rebuilt information of the internal memory.

4. A memory system, comprising:
   a memory device configured to include a plurality of memory blocks in which data is stored; and
   a memory controller configured to control the memory device such that debugging information is stored in an open block, among the plurality of memory blocks, on which an operation is interrupted when a sudden power off (SPO) occurs.

5. The memory system according to claim 4, wherein the memory controller comprises:
   an internal memory configured to store system information; and
   a central processing unit (CPU) configured to control the internal memory and the memory device.

6. The memory system according to claim 5, wherein the internal memory is implemented as a Static Random Access Memory (SRAM).

7. The memory system according to claim 5, wherein the CPU controls the memory device such that the debugging information is stored in a page on which the program operation is interrupted, among pages in the open block.

8. The memory system according to claim 7, wherein the CPU maps an address of the page in which the debugging information is stored to the internal memory.

9. The memory system according to claim 7, wherein the memory controller controls the memory device such that data stored in a page on which the program operation is not yet completed is copied to an erase page.

10. The memory system according to claim 7, wherein the memory controller controls the memory device such that data in a page, which is adjacent to a page in which the SPO has occurred and on which the program operation has been performed, is copied to an erase page.

11. The memory system according to claim 10, wherein the memory controller sets a page adjacent to the page in which the SPO has occurred to a bad page, and maps an address of the bad page to an address of the erase page.

12. The memory system according to claim 11, wherein the memory controller controls the memory device such that, after the data has been copied, a program operation is performed on remaining erase pages, among the pages of the open block.

13. The memory system according to claim 4, wherein the debugging information comprises a firmware information table, a system information table, a system fragment table, a logical to physical address table, a physical to logical address table, and a rebuild information table.

14. A method of operating a memory device, comprising:
   performing a program operation on a selected page among a plurality of pages of the memory device;
   writing debugging information to the selected page during a boot process of the memory device after a sudden power off (SPO) occurs while the program operation on the selected page is being performed;
   mapping an address of the selected page in which the debugging information is stored, using a controller;
   reading the debugging information from the selected page in response to the mapped address during a subsequent boot process, using the controller; and
   detecting an environment for a previously performed rebuild operation based on the read debugging information, and then reconstructing an environment that existed at a time at which the SPO has occurred.

15. The method according to claim 14, wherein the debugging information comprises a firmware information table, a system information table, a system fragment table, a logical to physical address table, a physical to logical address table, and a rebuild information table.

16. The method according to claim 14, further comprising, during the boot process performed after occurrence of the SPO:
   copying data in a page, which is adjacent to the selected page and on which the program operation has been performed, to an erase page.

17. The method according to claim 16, further comprising:
   setting the page, which is adjacent to the selected page and on which the program operation has been performed, to a bad page; and
   mapping an address of the bad page to the erase page.

* * * * *